United States Patent Office 3,408,317
Patented Oct. 29, 1968

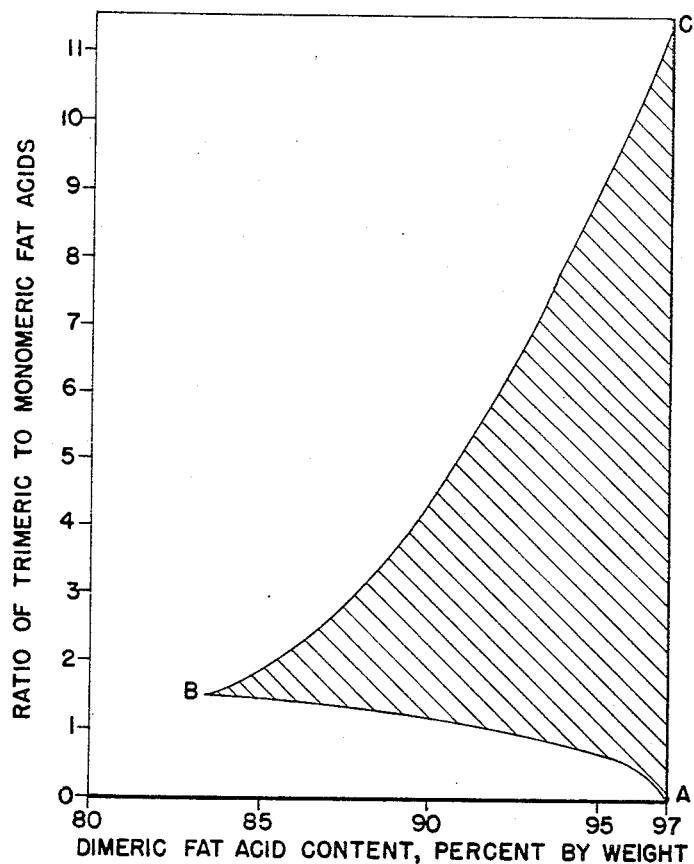

3,408,317
LOW MELTING POLYAMIDE RESIN OF FRACTIONATED POLYMERIC FAT ACIDS AND A MIXTURE OF ETHYLENE DIAMINE AND DIAMINOPROPANE
Leonard R. Vertnik, Minneapolis, Minn., assignor to General Mills, Inc., a corporation of Delaware
Filed Oct. 19, 1964, Ser. No. 404,889
6 Claims. (Cl. 260—18)

ABSTRACT OF THE DISCLOSURE

There is disclosed a low melting polyamide resin of fractionated polymeric fat acids and a mixture of ethylene diamine and diaminopropane. The polymeric fat acids have a dimeric content greater than 83% and when in the range of 83 to 97% a trimer to monomer ratio within a certain area of the drawing. The products find utility as thermoplastic adhesives.

This invention relates to low melting polyamide resins prepared from fractionated polymeric fat acids and a mixture of ethylene diamine and diaminopropane. These resins find utility as a thermoplastic adhesive for bonding materials that are too heat sensitive (decompose) for use with current commercial thermoplastic polyamide adhesives. The resins of the present invention are suitable for bonding materials such as rubber, wood, paper, cloth, leather and metals.

The resins of the present invention possess a lower softening point and heat seal range than is currently available with thermoplastic polyamide adhesives. This difference in properties is achieved by the use of a mixture of diamines in forming the polyamide resins. In addition to the lower heat seal range and softening point, the resins of the present invention provide improved flexibility as evidenced by greater elongation, better Izod Impact as well as improved low temperature properties. The resins also possess good viscosity stability at elevated temperature, good retention of tensile strength and elongation on heat aging, and good resistance to surface skinning at elevated temperatures.

It has been discovered that the lower heat seal range and softening point can be achieved by employing as the amine reactant with the fractionated polymeric fat acids, a mixture of ethylene diamine and diaminopropane. The fractionated polymeric fat acids employed must have a certain minimum dimeric fat acid content of about 83% by weight and in addition, in the range of a dimeric fat acid content between 83 and about 97%, the polymeric fat acid must have a certain trimer to monomer ratio.

The drawing is a graphical representation showing the area ABC defining the necessary trimer to monomer ratio of the fat acids when the dimeric fat acid content lies within the range of about 83 to 97% by weight.

It is therefore an object of this invention to provide a polyamide resin having a lower heat seal range and softening point.

It is also an object of this invention to provide a process of preparing such polyamide resins.

It is also an object of this invention to provide a polyamide resin of fractionated polymeric fat acids and a mixture of ethylene diamine and diaminopropane.

Briefly, the polyamides of the present invention are prepared by reacting the mixture of diamines with the desired polymeric fat acid. Essentially, one molar equivalent of amine is employed per molar equivalent of carboxyl group present although it is preferable that a slight excess of acid be present, i.e., up to about 4 equivalent percent excess of acid. This excess of acid provides a desirable degree of acid termination which is desirable to avoid viscosity drift, e.g., in melts of the polyamide during use as an adhesive.

The time and temperature of reaction may be varied over a considerable range but is usually from 150 to 300° C. for a period of from ½ to 8 hours, the longer time period being used at the lower temperatures. The reaction may be conducted in two stages, the first being at atmospheric pressure at the desired temperature for up to 5 hours, during which time the water of condensation is allowed to distill off and following which a vacuum (about 20 mm. Hg) is applied and the product maintained at the desired temperature for up to about 3 hours or until a desired viscosity is attained.

As indicated, a mixture of ethylene diamine and diaminopropane is employed. The equivalent ratio of amine from ethylene diamine to diaminopropane can be varied over a wide range. In general, the amine equivalents from ethylene diamine should be employed in excess. Accordingly, the equivalent ratio of ethylene diamine to diaminopropane will be greater than 1:1 up to 4:1. A ratio of 3:1 is preferred. Both 1,3-diamino-propane and 1,2-diaminopropane may be employed.

The required polymeric fat acid is one having a particular trimer to monomer ratio for each level (from 83 to 97%) of dimeric fat acids content. Defining the exact trimer:monomer ratio for each level of dimeric fat acids content by an appropriate mathematical relationship is impractical. For our purposes, we have found that a graphical representation most accurately depicts the bounds of the present invention. Accompanying FIGURE 1 is a plot of the area at dimer contents within the range of about 83 to 97%, within which satisfactory products may be made using the concept of our invention. The ordinate is a scale of trimer:monomer ratio. The abscissa is a scale of dimeric fat acids content in percent by weight. The area bounded substantially within the curve ABC includes those polyamides, defined in the present invention, which are considered satisfactory adhesives. The area essentially outside the area ABC contains those polyamides which are not satisfactory adhesives. Those products falling generally below the boundary AB fail as being brittle and non-flexible or having too low softening point and therefore an undesirable heat seal range. Those falling generally above the boundary BC fail as having a melt viscosity of a level impractically high or as being intractable gelled polymers. As is apparent from the curve ABC at substantially 84% dimer content, the trimer to monomer ratio is extremely narrow, being substantially 1.5. As the dimer content increases, this ratio expands to a widening range. At about 97% dimer acid content, the criticality of the trimer to monomer ratio becomes almost non-existent. As a practical matter, at 97% dimer acid content, a general range of the ratio of 0.3 to about 10 may be given. In excess of 97% dimeric fat acid content, the trimer to monomer ratio is not critical. As the dimeric fat acid content approaches 100%, the trimer to monomer ratio approaches the limits of 0 to infinity. As a practical matter, trimer to monomer ratio of 0.1 to 50 or 100 would be employed as the dimeric fat acid content approached 100%. At 100% dimeric fat acid content, if achieved, there would, of course, be no trimer or monomer present.

The term "polymeric fat acids" as used herein, is intended to be generic to polymerized acids obtained from "fat acids." The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic aid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids. Mixtures of these two acids are found in tall oil fatty acids and as a practical matter, the polymeric fat acids of commerce are generally obtained from the polymerization of tall oil fatty acids.

Having obtained the polymeric fat acids, they may then be fractionated, for example, by conventional techniques of distillation or solvent extraction. They may be hydrogenated (before or after distillation) to reduce unsaturation such as under hydrogen pressure in the presence of a hydrogenation catalyst.

Typical compositions of commercially available polymeric fat acids, based on unsaturated $C_{18}$ fat acids, i.e., tall oil fatty acids, are:

$C_{18}$ monobasic acids ("monomer") 5–15% by weight;
$C_{36}$ dibasic acids ("dimer") 60–80% by weight;
$C_{54}$ (and higher) ("trimer") polybasic acids 10–35% by weight.

The relative ratios of monomer, dimer and trimer (or higher) in unfractionated polymeric fat acids are dependent on the nature of the starting material and the conditions of polymerization. For the purposes of this invention, the term "monomeric fat acids" refers to the unpolymerized monomeric acids or derivatives present in the polymeric fat acids; the term "dimeric fat acids" refers to the dimeric acids or derivatives (formed by the dimerization of two fat acid molecules); and the term "trimeric fat acids" refers to the residual higher polymeric forms consisting primarily of trimeric acids or derivatives, but containing some higher polymeric forms.

For the purposes of this invention, the terms "monomeric," "dimeric" and "trimeric" fat acids are defined further by a micromolecular distillation analytical method. The method is that of Paschke, R. F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue. The figures herein are based on this method unless otherwise specified.

Mixtures may be fractionated by suitable means such as high vacuum distillation or solvent extraction technique so as to obtain dimer acid cuts of greater than 83% by weight. It is these dimer-rich fractions which are the starting materials for the polyamides of the present invention.

The following examples will serve to illustrate further the spirit and scope of the present invention. These examples are not to be construed as limiting, but merely serve as illustrations of compositions falling within the scope of our invention. Percentages and parts are by weight unless specifically noted otherwise.

*Example 1*

Into a reactor equipped with a thermometer, stirrer, and distillation head were placed 1.03 equivalents of a polymeric fat acid (fractionated polymerized tall oil fatty acids) having the following analysis by the Paschke et al. method previously mentioned.

Monomer (M) _____ percent__ 1.2
Dimer (D) _____ do____ 98.5
Trimer (T) _____ do____ 0.3
Acid value (A.V.) _____ 193.8
Saponification value (S.V.) _____ 198.7

After heating the contents to 65° C., 0.75 equivalent of ethylene diamine and 0.25 equivalent of 1,3-diaminopropane were added. The mixture was gradually heated over a two hour period to 225° C. during which time most of the water of the reaction was removed. The temperature was held at 225° C. for two hours under a nitrogen stream. Water pump vacuum was then applied (about 5–15 mm. Hg) and the temperature held at 225° C. for an additional three hours. The properties of this resin are recorded in the appended Table 1.

*Example 2*

In the same manner as Example 1, another polyamide was prepared employing 19.48 pounds (0.645 eq.) of ethylene diamine, 7.85 pounds (0.215 eq.) of 1,3-diaminopropane and 250 pounds (0.887 eq.) of fractionated polymerized tall oil fatty acids having the following analysis:

M _____ percent__ 1.8
D _____ do____ 95.9
T _____ do____ 2.2
A.V. _____ 188.4
S.V. _____ 198.8 the temperature while vacuum was applied, however, being 250° C. for 3.5 hours. The properties are recorded in Table I below:

TABLE I

|  | Example 1 | Example 2 |
|---|---|---|
| Amine Number | 1.1 | 1.0 |
| Acid Number | 8.1 | 7.8 |
| B & R Softening Point, ° C. (Method ASTM E28-58T) | 100 | 103 |
| Melt Viscosity, poise: |  |  |
| At 203° C | 30 |  |
| At 210° C |  | 23 |
| Melt Viscosity Stability at 205° C.: |  |  |
| 0 hrs | 30 |  |
| 8 hrs | 39 |  |
| 24 hrs | 42.5 |  |
| Heat Seal Range, ° C | 65–140 | 70–140 |
| Tensile Strength, p.s.i. (Method ASTM-D-1248-60T): |  |  |
| 75° F | 723 | 763 |
| 140° F | 73 | 88 |
| −40° F | 2,555 | 1,779 |
| 205° C. (24 hrs.) | 743 |  |
| 205° C. (72 hrs.) |  | 602 |
| Elongation, Percent: |  |  |
| 75° F | 479 | 657 |
| 140° F | 208 | 229 |
| −40° F | 5 | 3 |
| 205° C. (24 hrs.) | 525 |  |
| 205° C. (72 hrs.) |  | 632 |
| Izod Impact, ft.-lbs./in. (Method ASTM-256-56): |  |  |
| Notched |  | 0.65 |
| Unnotched |  | 6.4 |
| Water Absorption, Percent (Method ASTM D-570-59aT): |  |  |
| 24 hrs |  | 0.13 |
| 6 weeks |  | 0.34 |

Other properties based on resin of Example 2:

Anti-skinning properties at 210° C.:
30 g. in an aluminum cup did not form a continuous film even after 11 hours.

Wood to wood shear strength, lbs./in.$^2$:
Fir to fir _____ 692
Oak to oak _____ 710

The procedure used here involved taking cubes of wood 1 in. x 1 in. x 1 in. and overlapping so that ½ square inch of their surfaces were bonded using the molten resin. These cubes were then loaded under compression until bond failure occurred.

SOLUBILITY IN VARIOUS SOLVENT SYSTEMS
[At 35% N.V.]*

| Solvent | Reflux Hot | Reflux Cooled to 75° F. | 24 hrs. at 75° F. |
|---|---|---|---|
| Toluene | S | G |  |
| N-Propanol | S | S | S |
| 1:1 N-Propanol:Toluene | S | S | S |
| 1:1 N-Propanol:Filmex #1 | S | S | S |
| 99% Isopropanol | S | S | S |
| 1:1 Isopropanol:Toluene | S | S | S |
| 95% Isopropanol | S | S | S |
| 1:1 Isopropanol:Filmex #1 | S | S |  |
| N-Butanol | S | I | S |
| 1:1 N-Butanol:Toluene | S | S | S |
| Methyl Pentynol | S | S | S |
| 1:3 Methyl Pentynol:Toluene | S | S | S |
| Filmex #1 | Hazy | S |  |
| 1:1 Filmex #1:Toluene | S | I | S |
| Cyclohexanol | S | S | S |
| Methyl Isobutyl Ketone | S | S |  |
| Hexane | I | G |  |
| Cellosolve | S |  | G |
| Heptane | I | S |  |
| Methyl Isobutyl Carbinol | S |  | S |

*S=Soluble. I=Insoluble. G=Gel.

The examples to follow will serve to further illustrate the invention.

*Example 3*

Same procedure as Example 1 and polymeric fat acid as in Example 2, ratio acid to amines 1.02.

Charge:
Polymeric fat acid _____eq__ 1.754
Ethylene diamine _____eq__ 1.290
1,3-diaminopropane _____eq__ .430

Properties:
Amine No. _____ 1.8
Acid No. _____ 5.3
Ball and ring softening pt., ° C. _____ 103
Melt viscosity, poise 205° C. _____ 50.5
Heat seal range, ° C. _____ 60–150
Tensile strength, p.s.i. at 75° F. _____ 1220
Elongation, percent at 75° F. _____ 602

*Example 4*

Repeat Example 3, but use polymeric fat acid of Example 1. This is a high purity acid of 98.5% dimer. Charge: same equivalents as Example 3.

Properties:
Amine No. _____ 1.6
Acid No. _____ 6.1
Ball and ring softening point, ° C. ____ 103
Melt viscosity, poise, at 105° C. _____ 34
Tensile strength, p.s.i. at 75° F. _____ 1458
Elongation, percent at 75° F. _____ 642
Heat seal range, ° C. _____ 60–150

*Example 5*

Same procedure as Example 1, equivalents ratio of acid to amine of 1.04 employing a polymeric fat acid from polymerized tall oil fatty acids having the following analysis:

Acid value _____ 193.1
Saponification value _____ 198.6
M _____percent__ 1.2
D _____do____ 96.3
T _____do____ 2.4
Equivalent wt. (based on sap. value) _____ 283

Charge:
Dimer acid _____eq__ 1.716
Ethylene diamine _____eq__ 1.287
1,3-diaminopropane _____eq__ .361

Properties:
Amine No. _____ 1.0
Acid No. _____ 11.1
Ball and ring softening point, ° C. ____ 95
Melt viscosity, poise, 205° C. _____ 18.5
Tensile, p.s.i. at 75° F. _____ 662
Elongation, percent at 75° F. _____ 573
Heat seal range, ° C. _____ 65–130

*Example 6*

Same procedure as Example 1 and polymeric fat acids of Example 5.

Reactants:
Polymeric fat acids _____eq__ 1.989
Ethylene diamine _____eq__ 1.303
1,2-diaminopropane _____eq__ 0.434

Result:
Amine No. _____ 1.1
Acid No. _____ 6.5
Ball and ring softening point, ° C. ____ 102.5
Viscosity, p. at 205° C. _____ 35
Tensile, p.s.i. _____ 1870
Elongation, percent _____ 567
Heat seal, ° C. _____ 65–150

*Example 7*

A polyamide resin was prepared in the same manner as Example 1 employing an equivalents ratio of acid to amine of 1.03 to 1 and an equivalents ratio of ethylene diamine to 1,3-diaminopropane of 3 to 1. In this instance, the polymeric fat acid product was a mixture of products to provide the following monomer, dimer and trimer analysis:

M _____percent__ 5.14
D _____do____ 86.0
T _____do____ 8.88
T/M _____ 1.73

The foregoing was obtained by blending the polymeric fat acid employed in Example 5, monomeric tall oil fatty acids (Pamak 1) and a polymerized tall oil fatty acid having the following analysis:

| | |
|---|---:|
| M .................................................. percent.. | 2.05 |
| D .................................................. do.... | 81.05 |
| T .................................................. do.... | 16.9 |
| A.V. ................................................ | 183.4 |
| S.V. ................................................ | 196.3 |
| Equivalent weight based on S.V. ................ | 286 |

Result:

| | |
|---|---:|
| Amine No. ........................................ | 1.8 |
| Acid No. .......................................... | 6.2 |
| Ball and ring softening pt., ° C. ............ | 99.5 |
| Viscosity, poises 225° C. .................... | 40 |
| Tensile, p.s.i. .................................... | 1253 |
| Elongation, percent .......................... | 625 |
| Heat seal, ° C. .................................. | 75–160 |

As shown in the foregoing, the resins of the present invention have softening points of about 95 to 105° C. and a heat seal range of about 60 to 150° C., while possessing good overall properties.

The embodiments of the invention in which an exclusive property or privilege is claimed are defined as follows:

1. A polyamide resin consisting essentially of the condensation product of a mixture of ethylene diamine and diaminopropane with a polymeric fat acid having a dimeric fat content greater than 83% by weight and a trimeric to monomeric fat acids ratio substantially within the area ABC defined in the drawing when said dimeric fat acid content is within the range of greater than 83 to 97%, the molar equivalent of amine employed being essentially equal to the molar equivalents of carboxyl groups present and in which the equivalents ratio of ethylene diamine to diaminopropane is greater than 1:1 up to about 4:1.

2. A polyamide resin as defined in claim 1 in which said polymeric fat acid is employed in an excess of 4 equivalent percent.

3. A polyamide resin as defined in claim 1 in which said polymeric fat acid is polymerized tall oil fatty acids.

4. A polyamide resin consisting essentially of the condensation product of a mixture of 3 equivalents of ethylene diamine and 1 equivalent of 1,3-diaminopropane with polymerized tall oil fatty acids having a dimeric fat acid content greater than 83% by weight and a trimeric to monomeric fat acids ratio substantially within the area ABC defined in the drawing when said dimeric fat acid content is within the range of greater than 83% to about 97% by weight, said polymerized tall oil fatty acids being employed in an excess of 3 equivalent percent.

5. A polyamide resin consisting essentially of the condensation product of a mixture of 3 equivalents of ethylene diamine and 1 equivalent of 1,2-diaminopropane with polymerized tall oil fatty acids having a dimeric fat acid content greater than 83% by weight and a trimeric to monomeric fat acids ratio substantially within the area ABC defined in the drawing when said dimeric fat acid content is within the range of greater than 83% to about 97% by weight, said polymerized tall oil fatty acids being employed in an excess of 3 equivalent percent.

6. A method of adhering two surfaces together which comprises interposing an adhesive composition between said surfaces, said adhesive composition consisting essentially of the condensation product of a mixture of ethylene diamine and diaminopropane with a polymeric fat acid having a dimeric fat acid content greater than 83% by weight and a trimeric to monomeric fat acids ratio substantially within the area ABC defined in the drawing when said dimeric fat acid content is within the range of greater than 83 to 97%, the molar equivalent of amine employed being essentially equal to the molar equivalents of carboxyl groups present and in which the equivalents ratio of ethylene diamine to diaminopropane is greater than 1:1 up to about 4:1.

References Cited

UNITED STATES PATENTS

| | | | |
|---|---|---|---|
| 2,379,413 | 7/1945 | Bradley .............. | 260—18 |
| 2,450,940 | 10/1948 | Cowan et al. ........ | 260—404.5 |
| 2,695,908 | 11/1954 | Wittcoff et al. ...... | 260—18 |
| 2,794,013 | 5/1957 | Drechsel ............ | 260—18 |
| 2,839,219 | 6/1958 | Groves et al. ....... | 260—18 |
| 3,297,730 | 1/1967 | Fischer et al. ...... | 260—18 |

OTHER REFERENCES

Anderson et al., Journal American Chemical Society, vol. 70, pages 760–763, 1948.

DONALD E. CZAJA, *Primary Examiner.*

R. W. GRIFFIN, *Assistant Examiner.*